United States Patent
Yoshioka et al.

(10) Patent No.: US 7,604,086 B2
(45) Date of Patent: Oct. 20, 2009

(54) VEHICLE STEERING APPARATUS

(75) Inventors: Kazuya Yoshioka, Osaka (JP); Shinsuke Terada, Osaka (JP)

(73) Assignee: JTEKT Corporation, Osaka (JP)

( * ) Notice: Subject to any disclaimer, the term of this patent is extended or adjusted under 35 U.S.C. 154(b) by 119 days.

(21) Appl. No.: 11/822,080

(22) Filed: Jul. 2, 2007

(65) Prior Publication Data

US 2008/0000713 A1 Jan. 3, 2008

(30) Foreign Application Priority Data

Jul. 3, 2006 (JP) .............................. 2006-183387

(51) Int. Cl.
*B62D 5/04* (2006.01)
(52) U.S. Cl. .................. 180/444; 180/443; 180/446
(58) Field of Classification Search ................ 180/444, 180/443, 446, 400
See application file for complete search history.

(56) References Cited

U.S. PATENT DOCUMENTS

| | | | |
|---|---|---|---|
| 4,629,024 A | 12/1986 | Buike et al. | |
| 5,906,250 A | 5/1999 | Haga et al. | |
| 6,012,347 A | 1/2000 | Hasegawa et al. | |
| 7,254,992 B2* | 8/2007 | Ishihara et al. ........... | 73/117.02 |
| 7,391,209 B2* | 6/2008 | Asano ................... | 324/207.25 |
| 2002/0047460 A1* | 4/2002 | Yoneda et al. ............. | 310/216 |
| 2002/0171320 A1* | 11/2002 | Wang et al. ............... | 310/261 |
| 2003/0201137 A1* | 10/2003 | Crapo et al. ............... | 180/444 |
| 2006/0213320 A1* | 9/2006 | Menjak et al. .............. | 74/640 |
| 2007/0107974 A1* | 5/2007 | Ueno ........................ | 180/444 |
| 2007/0131475 A1* | 6/2007 | Matsubara .................. | 180/443 |
| 2008/0024028 A1* | 1/2008 | Islam et al. ................ | 310/187 |
| 2009/0133955 A1* | 5/2009 | Morikawa et al. .......... | 180/444 |

FOREIGN PATENT DOCUMENTS

| | | |
|---|---|---|
| DE | 100 33 810 A 1 | 1/2002 |
| EP | 1 867 553 A1 | 12/2007 |
| JP | 3336603 | 8/2002 |
| JP | 2005-145436 | 6/2005 |
| JP | 2006-046376 | 2/2006 |

* cited by examiner

*Primary Examiner*—Tashiana Adams
(74) *Attorney, Agent, or Firm*—Rabin & Berdo, PC

(57) ABSTRACT

A vehicle steering apparatus includes a steering member; a steering shaft connected to the steering member; a torque sensor for detecting a steering torque inputted into the steering member; and an electric motor for generating power that is transmitted to the steering shaft based on the steering torque detected by the torque sensor. The electric motor includes an annular rotor and an annular stator. The annular rotor includes an annular rotor core which coaxially surrounds the steering shaft and is rotatable together with a part of the steering shaft. An annular accommodation space is formed between an outer circumference of the steering shaft and an inner circumference of the annular rotor core, and at least a part of the torque sensor is disposed within the annular accommodation space.

9 Claims, 2 Drawing Sheets

VEHICLE STEERING APPARATUS

BACKGROUND OF THE INVENTION

1. Field of the Invention

The present invention relates to a vehicle steering apparatus.

2. Description of Related Arts

As a vehicle steering apparatus, an electric power steering apparatus is known which comprises a torque sensor for detecting steering torque inputted into a steering member, and an electric motor for generating power on the basis of the abovementioned steering torque.

For example, in Document 1 (Japanese Unexamined Patent Publication No. 2006-46376), an electric power steering apparatus is disclosed which comprises an electric motor and a speed reduction mechanism for amplifying the output of the electric motor and transmitting the same to a steering shaft. A part of the speed reduction mechanism is provided coaxially with the steering shaft and the electric motor is disposed around the speed reduction mechanism.

Further, in Document 2 (Japanese Unexamined Patent Publication No. 2005-145436), an electric power steering apparatus is disclosed which comprises an electric motor provided coaxially with a steering shaft. In this apparatus, the output of the electric motor is directly transmitted to the steering shaft, and a torque sensor is disposed coaxially with the steering shaft outside a frame of the electric motor.

The electric power steering apparatus disclosed in the Document 2 has an advantage that, by omitting a speed reduction mechanism, the apparatus can be reduced in size in the radial direction of the steering shaft.

However, by omitting a speed reduction mechanism, a high-power-output and large-sized electric motor is necessary. As a result, the electric power steering apparatus has a disadvantage that the apparatus grows in size in the axial direction of the steering shaft.

An object of the present invention is to provide a vehicle steering apparatus reduced in size in the radial and the axial directions of the steering shaft.

SUMMARY OF THE INVENTION

A preferred embodiment of the present invention provides a vehicle steering apparatus comprising a steering shaft connected to a steering member, and a cylindrical steering column rotatably supporting the steering shaft. The vehicle steering apparatus further comprising a torque sensor for detecting the steering torque inputted into the steering member, and an electric motor for generating power on the basis of the steering torque detected by the torque sensor. The electric motor comprises an annular rotor and an annular stator. The rotor comprises an annular rotor core which is coaxially surrounding the steering shaft and is rotatable together with a part of the steering shaft. At least a part of the torque sensor is disposed in the inward position of the rotor core in the radial direction.

According to this embodiment, the apparatus can be reduced in size in the axial direction by disposing the torque sensor occupying a part of the space in the axial direction of the steering shaft within an accommodation space as a part of the inner space of the electric motor. Thereby, a desired amount of absorption stroke of a shock absorbing mechanism can be surely obtained.

A part or the whole of the torque sensor may be disposed within the accommodation space. Preferably, the whole of the torque sensor is disposed within the accommodation space so that the apparatus can be more reduced in size in the axial direction.

DETAILED DESCRIPTION OF THE PREFERRED EMBODIMENT

An embodiment of the present invention will be now described concretely in the following with reference to the appended drawings.

Figure 1:
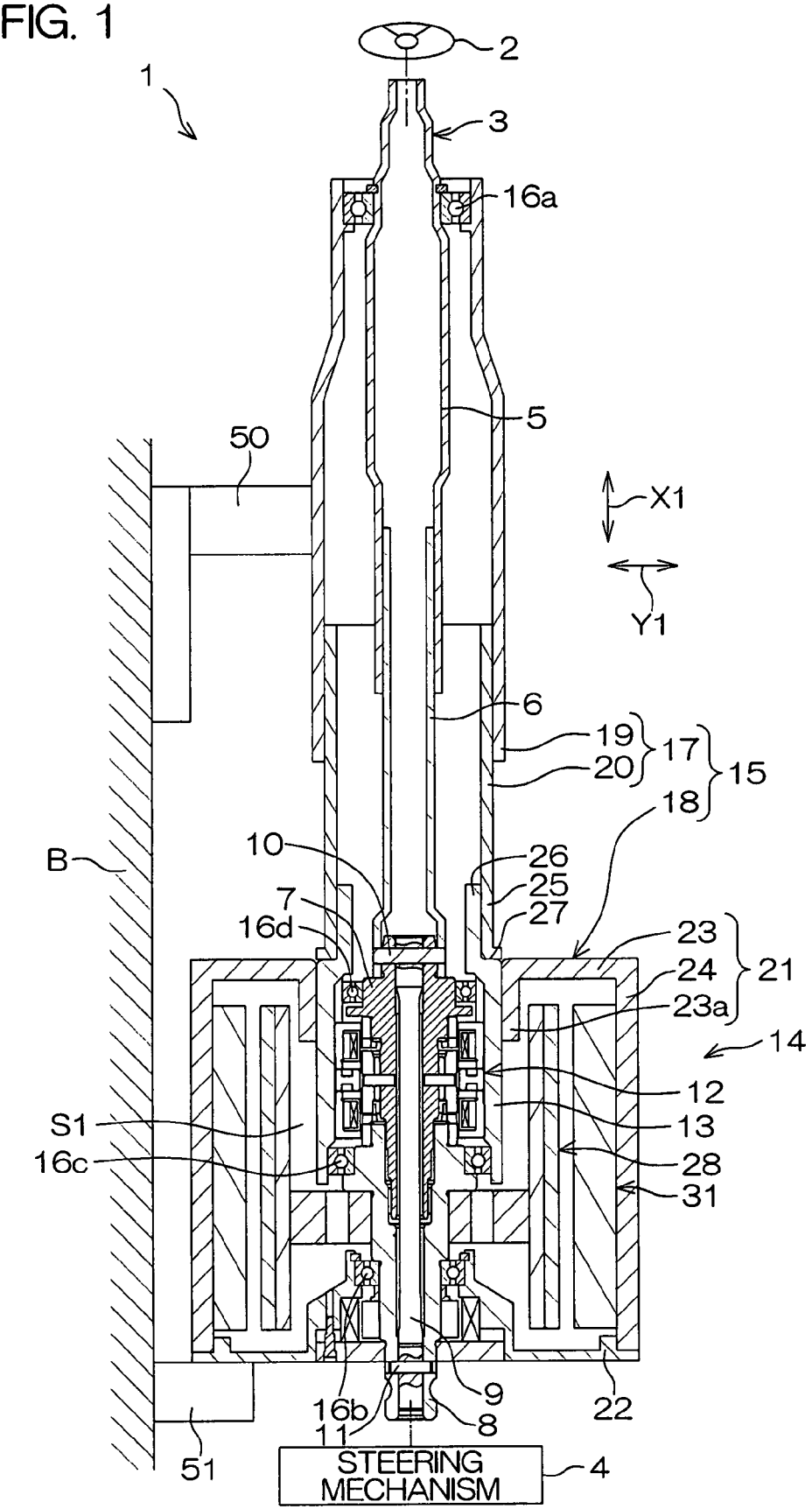
FIG. 1 is a sectional pattern diagram showing the schematical structure of an electric power steering apparatus as a vehicle steering apparatus according to an embodiment of the present invention.
Figure 2:
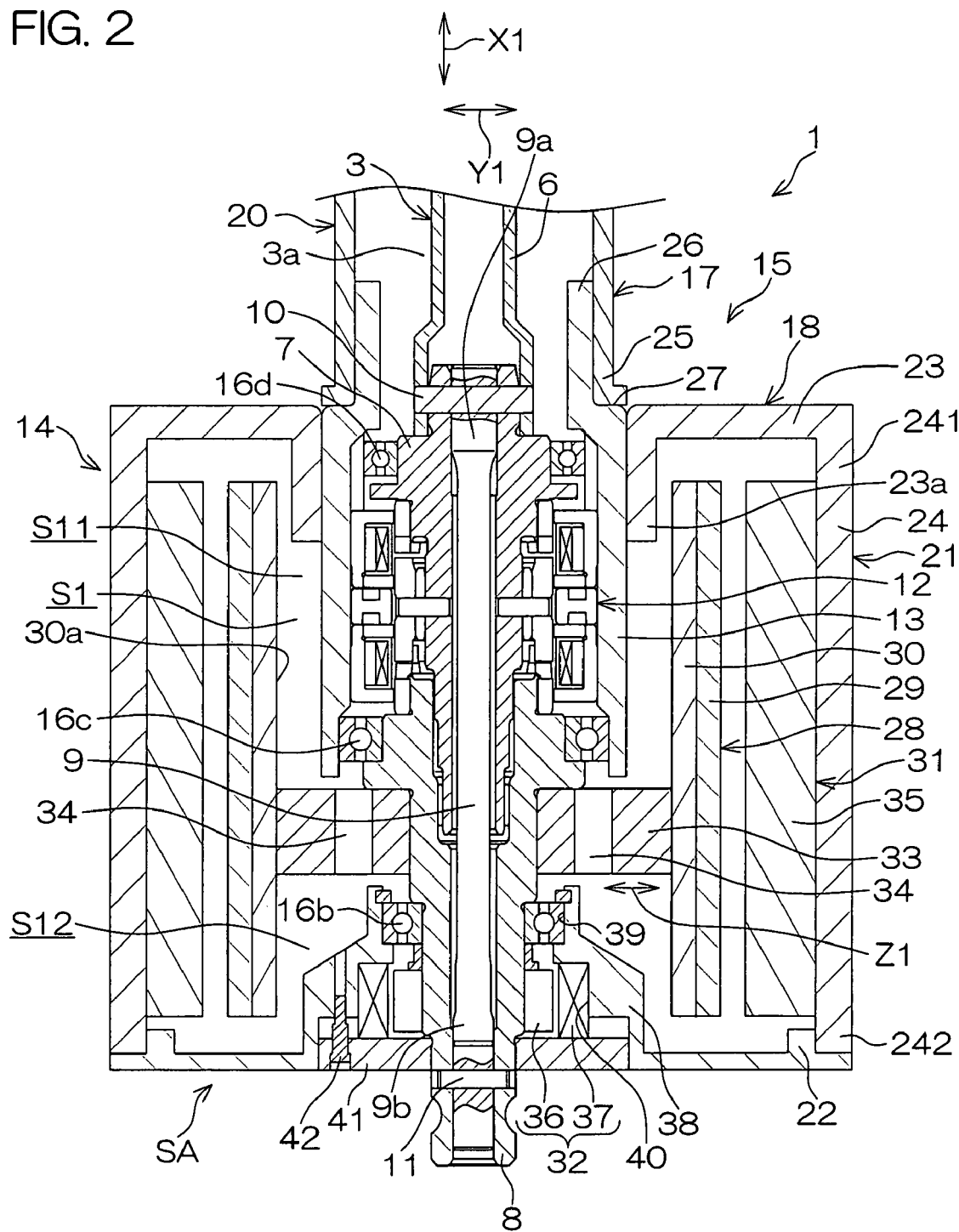
FIG. 2 is an enlarged sectional view showing an electric motor provided in the electric power steering apparatus and parts in the vicinity thereof.

FIG. 1 is a sectional pattern diagram showing the schematical structure of an electric power steering apparatus 1 as a vehicle steering apparatus according to an embodiment of the present invention. FIG. 2 is an enlarged sectional view showing an electric motor 14 provided in the electric power steering apparatus 1 and parts in the vicinity thereof.

Referring to FIGS. 1 and 2, the electric power steering apparatus 1 comprises a steering member 2 such as a steering wheel, a steering shaft 3 connected to the steering member 2, and a steering mechanism 4 such as a rack and pinion mechanism connected to the steering shaft 3 through an unshown intermediate shaft.

The steering shaft 3 comprises a cylindrical upper shaft 5, a cylindrical lower shaft 6, a cylindrical input shaft 7 and a cylindrical output shaft 8. These shafts 5, 6, 7 and 8 are disposed on the same axis.

A part of the lower shaft 6 is fitted with the inner circumference of a part of the upper shaft 5. The upper shaft 5 and the lower shaft 6 are connected to each other so as to be relatively movable in an axial direction X1 of the steering shaft 3 and be rotatable together.

A part of the input shaft 7 is fitted with the inner circumference of a part of the output shaft 8. The input shaft 7 and the output shaft 8 are connected to each other so as to be relatively rotatable by means of a torsion bar 9 penetrating trough the insides of the input shaft 7 and the output shaft 8.

Specifically, one end part 9a of the torsion bar 9 is connected to the input shaft 7 by means of a pin 10 penetrating through the one end part 9a and the input shaft 7 in a radial direction Y1 of the steering shaft 3. The other end part 9b of the torsion bar 9 is connected to the output shaft 8 by means of a pin 11 penetrating through the end part 9b and the output shaft 8 in the radial direction Y1.

Further, a torque sensor 12 is provided around the fitted part of the input shaft 7 and the output shaft 8 coaxially with the input shaft 7 and the output shaft 8. The torque sensor 12 detects a steering torque inputted in the steering member 2 on the basis of a magnetic resistance changing in accordance with the relative rotation amount of the input and output shafts 7, 8. The torque sensor 12 is accommodated in a cylindrical sensor housing 13. However, the torque sensor may be of another kind.

Apart of the input shaft 7 is fitted with the inside of the lower shaft 6. The lower shaft 6 and the input shaft 7 are connected to each other by means of the pin 10. In other words, the lower shaft 6, the input shaft 7 and the torsion bar 9 are connected one another by means of the same pin 10.

With respect to the steering shaft 3, the electric motor 14 for transmitting the power to the steering shaft 3 and a cylindrical steering column 15 for rotatably supporting the steering shaft 3 are provided around the steering shaft 3.

In this embodiment, a brushless motor is used as the electric motor 14. The electric motor 14 generates the power on the basis of the steering torque detected by the torque sensor 12. The electric motor 14 is coaxially connected to the steering shaft 3. The power generated by the electric motor 14 is directly transmitted to the steering shaft 3.

The steering column 15 rotatably supports the steering shaft 3 through a plurality of bearings 16a, 16b, 16c and 16d. The steering column 15 is constituted by a cylindrical jacket 17 and a cylindrical motor frame 18 which is a part of the electric motor 14.

The jacket 17 comprises a cylindrical upper jacket 19 and a cylindrical lower jacket 20 which are fitted to each other. The upper jacket 19 rotatably supports the upper shaft 5 through the bearing 16a so as to be movable together with the upper shaft 5 in an axial direction X1. In other words, the steering member 2, the upper shaft 5 and the upper jacket 19 are movable together in the axial direction X1.

A part of the lower jacket 20 is fitted with the inner circumference of the upper jacket 19. The upper jacket 19 moves in the axial direction X1 with respect to the lower jacket 20, for example, at the time of vehicle collision, so that shock caused by the collision can be absorbed.

Specifically, a plurality of calking projections (not shown) are formed on the inner circumference of the upper jacket 19. These calking projections are calked to the outer circumference of the lower jacket 20. When a driver collides against the steering member 2 (the second collision) after the vehicle collides (the first collision), the shock given by the driver to the steering member 2 is absorbed by a resistance caused by the relative movement of the both jackets 19, 20 in the axial direction X1.

The motor frame 18 comprises a cylindrical main part 21 one end of which is opened, and an annular lid member 22 closing the one end of the main part 21.

The main part 21 comprises an outer cylindrical part 24 as a cylindrical part, and an annular end wall 23 inwardly extended in the radial direction Y1 from a first end part 241 of the outer cylindrical part 24. In the central part of the end wall 23, an inner cylindrical part 23a is provided which is downwardly extended in the axial direction X1 (to the steering mechanism 4 side) from the inner circumference of the end wall 23. The abovementioned sensor housing 13 is connected to the inner circumference of the inner cylindrical part 23a provided on the end wall 23, for example, by press fitting. The abovementioned lid member 22 closes a second end 242 of the outer cylindrical part 24.

Further, the lower jacket 20 is fitted onto an end part 26 of the sensor housing 13 projected toward the steering member 2 side beyond the end wall 23. An end part 25 of the lower jacket 20 abuts against an annular stepped part 27 provided on the end part 26 of the sensor housing 13. Thereby, the downward movement of the lower jacket 20 in the axial direction X1 with respect to the sensor housing 13 is surely restricted.

Further, the electric power steering apparatus 1 is fitted to a part B of a vehicle body by means of a fitting member 50 fixed to the upper jacket 19 and a fitting member 51 fixed to the motor frame 18. The fitting member 50 fixed to the upper jacket 19 includes a breakable synthetic resin pin (not shown).

Therefore, if a shock more than a predetermined value is applied to the fitting member 50 at the time of the abovementioned second collision, the breakable synthetic resin pin is broken, so that the fixed state between the upper jacket 19 and the part of the vehicle body B is released. As a result, the steering member 2, the upper shaft 5 and the upper jacket 19 become movable in the axial direction X1 with respect to the part B of the vehicle body.

Referring now to FIG. 2, the structure of the electric motor 14 will be described in detail.

The electric motor 14 comprises a cylindrical rotor 28 connected to the output shaft 8 so as to be rotatable together with the output shaft 8, a cylindrical stator 31 surrounding the rotor 28 with a predetermined space therebetween in the radial direction Z1, and a resolver 32 as a rotational position detecting member for detecting the rotational position of the rotor 28. The rotor 28 and the stator 31 are accommodated in the abovementioned motor frame 18.

The rotor 28 comprises a pipe-shaped, for example, cylindrical rotor core 30 and a plurality of permanent magnets 29 held on the outer circumference of the rotor core 30. The plurality of the permanent magnets 29 are held on the outer circumference of the rotor core 30 with a space therebetween in the circumferential direction of the rotor core 30 so as to be rotatable together with the rotor core 30. On the outer circumference of the rotor 28, N poles and S poles are alternately arranged in the circumferential direction.

The rotor core 30 surrounds the input shaft 7 and the output shaft 8 with a predetermined space in the radial direction Z1 of the rotor core 30. In the inward position of the rotor core 30 in the radial direction Z1, an annular accommodation space S1 surrounding the shafts 7, 8 is formed. That is, the accommodation space S1 is formed as between the circumferences of the shafts 7, 8 an outer circumference 3a of the steering shaft 3 and an inner circumference 30a of the rotor core 30.

Within the accommodation space S1, at least a part, and preferably the whole, of the abovementioned torque sensor 12 is accommodated. Further, within the accommodation space S1, an annular connecting member 33 for connecting the rotor core 30 and the output shaft 8 so that they can rotate together and at least a part of the resolver 32 are disposed.

Specifically, the connecting member 33 is disposed between the torque sensor 12 and the resolver 32 in the axial direction X1. The resolver 32 is disposed on the opposite side of the torque sensor 12 with the connecting member 33 sandwiched therebetween.

In other words, the accommodation space comprises a first space S11 and a second space S12 disposed on both sides of the steering shaft 3 in the axial direction X1 with the connecting member 33 sandwiched therebetween.

At least a part of the torque sensor 12 is accommodated within the first space S11 and the at least part of the resolver 32 is accommodated within the second space S12.

The connecting member 33 is formed in an annular shape having a predetermined thickness. Between the inner circumference and the outer circumference of the connecting member 33, a plurality of lightening hole 34 as lightening sections are provided. The connecting member 33 and the output shaft 8 are connected so as to be rotatable together, for example, by press fitting. Therefore, the rotor core 30 and the output shaft 8 are mutually connected through the connecting member 33 so as to be rotatable together.

Further, the rotor core 30 is formed of an electromagnetic shield material preventing electromagnetic noises from passing. Therefore, electromagnetic noises generated from the electronic parts (not shown) disposed around the rotor core 30 cannot pass through the rotor core 30 and intrude into the accommodation space S1. That is, the accommodation space S1 defines an electromagnetically shielded space into which electromagnetic noises cannot intrude. As a result, the torque sensor 12 disposed in the accommodation space S1 can work stably without being influenced by electromagnetic noises.

As the electromagnetic shield materials, metals of a high electromagnetic permeability such as iron and permalloy can be used. By forming the rotor core 30 of a electromagnetic shield material such as iron and further setting the thickness of the rotor core 30 in the radial direction Y1 to a predetermined value, intrusion of electromagnetic noises can be effectively prevented.

The stator 31 has an annular stator core 35 and a coil (not shown) wound around the stator core 35. The stator core 35 is fixed to the inside of the outer cylindrical part 24 of the motor frame 18, for example, by press fitting.

The resolver 32 comprises an annular resolver rotor 36 as a movable part connected to the output shaft 8 so as to be rotatable together with the output shaft 8, and an annular resolver stator 37 as a fixed part surrounding the resolver rotor 36 with a predetermined space in the radial direction of the resolver rotor 36. The resolver stator 37 is held by a cylindrical part 38 provided in the center of the lid member 22. The resolver rotor 36 is connected to the output shaft 8 in a position corresponding to the resolver stator 37 in the axial direction X1.

Specifically, the cylindrical part 38 extends upwardly in the axial direction X1. The inner circumference of the cylindrical part 38 is provided with a bearing holding part 39 and a resolver stator holding part 40. The resolver stator 37 is held by the resolver stator holding part 40. The output shaft 8 is rotatably supported by the bearing 16b held by the bearing holding part 39 and the bearing 16c held on the inner circumference of the sensor housing 13. Further, a part of the cylindrical part 38 is disposed within the accommodation space S1.

For assembling the electric motor 14, first, a subassembly SA is assembled in which the resolver stator 37 and the bearing 16b are attached to the lid member 22 thereof. Next, while the bearing 16b is fitted onto the output shaft 8, the lid member 22 of the subassembly SA is fixed to the main part 21. Then, after the resolver rotor 36 is fitted onto the output shaft 8, a cover 41 for closing one end of the cylindrical part 38 is fixed to the cylindrical part 38, for example, by a volt 42.

As described above, in this embodiment, a speed reduction mechanism is omitted and the electric motor 14 is connected coaxially to the steering shaft 3, so that the electric power steering apparatus 1 can be reduced in size in the radial direction Y1. Further, since the torque sensor 12 is disposed within the accommodation space S1 which is a part of the inner space of the electric motor 14, the electric power steering apparatus 1 can be reduced in size in the axial direction X1. Thereby, a desired amount of absorption stroke of a shock absorbing mechanism (energy absorbing mechanism) can be surely obtained.

Further, since the rotor core 30 is formed of an electromagnetic shield material preventing intrusion of electromagnetic noises, the torque sensor 12 disposed within the accommodation space S1 can work stably without being influenced by electromagnetic noises generated around the rotor core 30.

In the abovementioned embodiment, description is given to a case in which a vehicle steering apparatus is an electric power steering apparatus 1. However, the present invention can be applied to a vehicle steering apparatus other than an electric power steering apparatus 1. The present invention can be applied, for example, to an automatic steering apparatus, a transmission ratio variable steering apparatus in which the ratio of the steering angle of a vehicle wheel with respect to the steering angle of the steering member is changeable, and the like.

Further, in the abovementioned embodiment, description is given to the case in which a rotor core 30 and a connecting member 33 are separately provided, but a rotor core 30 and a connecting member 33 maybe integrally formed of a single material.

The present invention has been described above in detail by means of the concrete embodiment, and these skilled in the art having understood the abovementioned description may easily think of the changes, alterations and equivalents thereof. Therefore, the present invention should be understood within the scope of the claims and the equivalents thereof.

This application corresponds to the Japanese Patent Application No. 2006-183387 filed in the Japan Patent Office on Jul. 3, 2006, the whole disclosure of which is incorporated in this application by citation.

What is claimed is:

1. A vehicle steering apparatus comprising:
   a steering member;
   a steering shaft connected to the steering member;
   a torque sensor for detecting a steering torque inputted into the steering member; and
   an electric motor for generating power that is transmitted to the steering shaft based on the steering torque detected by the torque sensor,
   wherein the electric motor comprises an annular rotor and an annular stator,
   wherein the annular rotor comprises an annular rotor core which coaxially surrounds the steering shaft and is rotatable together with a part of the steering shaft,
   wherein an annular accommodation space is formed between an outer circumference of the steering shaft and an inner circumference of the annular rotor core, and
   wherein at least a part of the torque sensor is disposed within the annular accommodation space.

2. The vehicle steering apparatus according to claim 1, further comprising a connecting member which connects the steering shaft and the annular rotor core so that the steering shaft and the annular rotor core are rotatable together.

3. The vehicle steering apparatus according to claim 2, wherein the connecting member includes a lightening section.

4. The vehicle steering apparatus according to claim 1, wherein the electric motor further comprises a rotational position detecting member for detecting a rotational position of the annular rotor core, and wherein at least a part of the rotational position detecting member is accommodated within the annular accommodation space.

5. The vehicle steering apparatus according to claim 2, wherein the connecting member is accommodated within the annular accommodation space, and wherein
   the annular accommodation space comprises a first space and a second space disposed on opposite sides of the steering shaft in an axial direction with the connecting member sandwiched there between.

6. The vehicle steering apparatus according to claim 5, wherein the electric motor further comprises a rotational position detecting member for detecting a rotational position of the annular rotor core, wherein at least part of the torque sensor is accommodated within the first space, and wherein the at least part of the rotational position detecting member is accommodated within the second space.

7. The vehicle steering apparatus according to claim 4, further comprising a cylindrical steering column rotatably supporting the steering shaft, wherein the cylindrical steering column comprises a cylindrical jacket and a motor frame connected coaxially with the jacket, and wherein the rotational position detecting member comprises (a) a movable part supported by the steering shaft so as to be rotatable together with the steering shaft, and (b) a fixed part fixed to the motor frame.

8. The vehicle steering apparatus according to claim 7, wherein the motor frame comprises a cylindrical part having an inner circumference to which the stator is fixed and a lid member closing an end of the cylindrical part, and wherein the fixed part of the rotational position detecting member is fixed to the lid member.

9. The vehicle, steering apparatus according to claim 1, wherein the annular rotor core comprises an electromagnetic shield material, and wherein the accommodation space is electromagnetically shielded by the annular rotor core.

* * * * *